US008649035B2

(12) United States Patent
Okubo (10) Patent No.: US 8,649,035 B2
(45) Date of Patent: Feb. 11, 2014

(54) IMAGE PROCESSOR, PRINTING SYSTEM, COMPUTER READABLE MEDIUM, AND IMAGE PROCESSING METHOD FOR RESUMING AN INTERRUPTED PRINTING PROCESS

(75) Inventor: Kenji Okubo, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1256 days.

(21) Appl. No.: 12/103,938

(22) Filed: Apr. 16, 2008

(65) Prior Publication Data

US 2009/0086253 A1 Apr. 2, 2009

(30) Foreign Application Priority Data

Sep. 27, 2007 (JP) ................................. 2007-250311

(51) Int. Cl.
*G06K 15/00* (2006.01)
(52) U.S. Cl.
USPC ........................................... 358/1.14; 399/19
(58) Field of Classification Search
USPC .................... 358/1.14, 296; 400/74; 399/19
See application file for complete search history.

(56) References Cited

U.S. PATENT DOCUMENTS

| 4,970,599 A * | 11/1990 | Nobuta ........................ 358/296 |
| 5,768,483 A * | 6/1998 | Maniwa et al. ............. 358/1.14 |
| 2004/0126166 A1* | 7/2004 | Miyake ........................... 400/74 |

FOREIGN PATENT DOCUMENTS

| JP | 2002-137458 A | 5/2002 |
| JP | 2003-305906 A | 10/2003 |
| JP | 2005-59463 A | 3/2005 |
| JP | 2006-084850 A | 3/2006 |
| JP | 2006-272904 A | 10/2006 |

OTHER PUBLICATIONS

Japanese Notification of Reasons for Refusal dated Nov. 4, 2009 in corresponding Japanese Application No. 2007-250311.

* cited by examiner

*Primary Examiner* — Twyler Haskins
*Assistant Examiner* — Nicholas Pachol
(74) *Attorney, Agent, or Firm* — Sughrue Mion, PLLC (57) ABSTRACT

An image processor includes: a resuming unit that allows a printing device to resume an interrupted printing process; and an output processing unit that carries out an output process of resuming information including the reduced image of an image of a page in which the printing process is resumed and the information of the page in which the printing process is resumed.

5 Claims, 13 Drawing Sheets

IMAGE PROCESSOR, PRINTING SYSTEM, COMPUTER READABLE MEDIUM, AND IMAGE PROCESSING METHOD FOR RESUMING AN INTERRUPTED PRINTING PROCESS

CROSS-REFERENCE TO RELATED APPLICATIONS

This application is based on and claims priority under 35 U.S.C. 119 from Japanese Patent Application No. 2007-250311 filed Sep. 27, 2007.

BACKGROUND

1. Technical Field

The present invention relates to an image processor, a printing system, a computer readable medium, and an image processing method.

2. Related Art

In a printing device, when printing sheets are jammed, for instance, the printing device is full of the printing sheets during a printing process, a process for solving the jam of the printing sheets is ordinarily carried out, and then, a print resuming operation is carried out to subsequently resume the printing process.

SUMMARY

According to an aspect of the present invention, an image processor includes: a resuming unit that allows a printing device to resume an interrupted printing process; and an output processing unit that carries out an output process of resuming information including the reduced image of an image of a page in which the printing process is resumed and the information of the page in which the printing process is resumed.

BRIEF DESCRIPTION OF THE DRAWINGS

Exemplary embodiment of the present invention will be described in detail based on the following figures, wherein:

FIGS. 2A and 2B show one example of a recognizing image.

DETAILED DESCRIPTION

First Embodiment

Figure 1:
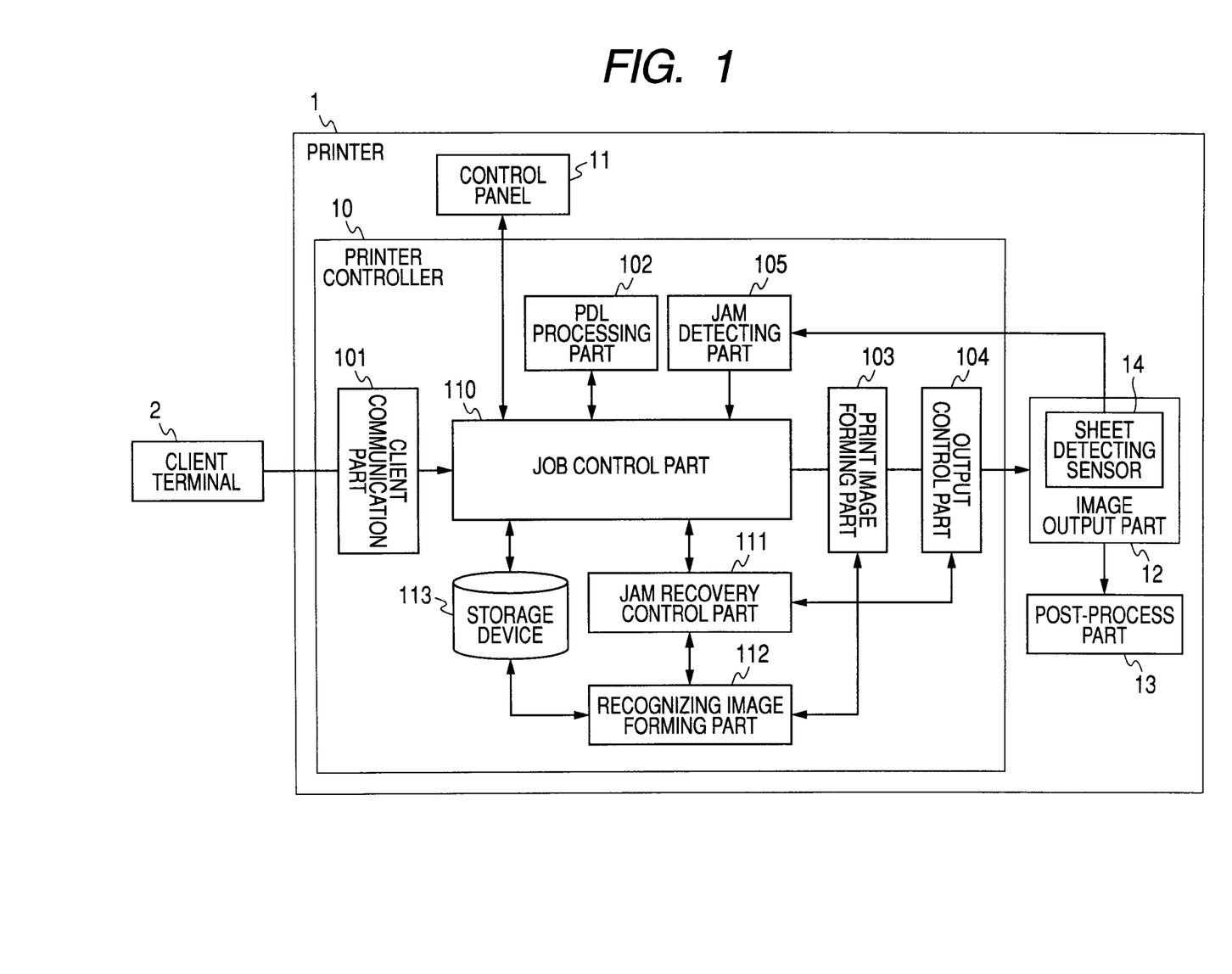
FIG. 1 is a block diagram of a printer system according to a first embodiment of the present invention.

FIG. 1 is a block diagram of a printer system according to a first embodiment of the present invention.

This printer system includes a printer 1 as an image processor for carrying out a printing process to a printing job and a client terminal 2 for transmitting the printing job to the printer 1 through a network. In FIG. 1, one client terminal 2 is shown, however, two or more client terminals may be provided.

The client terminal 2 includes a print driver. When a print instruction is transmitted from the print driver by a user, document data and the print instruction information of the user are converted into the printing job of a PDL (Page Description Language) form and transmitted to the printer 1. The client terminal 2 is formed with, for instance, a personal computer.

The print instruction information described in the PDL includes information of the number of copies, information of an output sheet size, information of a double printing, sheet tray selecting information, post-process information (staple information, punch information, sort information), etc.

The printer 1 includes a printer controller 10 for controlling the respective parts of the printer 1, a control panel 11, an image output part 12 and a post-process part 13.

(Printer Controller)

The printer controller 10 includes a client communication part 101, a PDL processing part 102, a print image generating part 103, an output control part 104, a jam detecting part 105, a job control part 110, a jam recovery control part 111, a recognizing image forming part 112 and a storage device 113.

The client communication part 101 carries out a communication with the client terminal 2 to receive the printing job from the client terminal 2.

The PDL processing part 102 interprets PDL data to expand the PDL data to raster image data on the basis of the interpretation.

The print image generating part 103 converts the raster image data to a CMYK form to be adapted to the image output part 12.

The output control part 104 carries out an output process of a print image generated by the print image generating part 103 to the image output part 12 by synchronizing with the image output part 12.

The jam detecting part 105 detects the generation of a jam when the time intervals of sheet detecting signals outputted from a below-described plurality of sheet detecting sensors 14 provided in the image output part 12 become a prescribed value or larger, and outputs a jam detecting signal showing a position where the jam arises to the job control part 110. The jam detecting part 105 may detect that the jam arises when the sheet detecting signal does not come from the sheet detecting sensor 14 for a prescribed time or more.

The job control part 110 receives the printing job from the client terminal 2 through the client communication part 101, temporarily stores and manages the printing job in the storage device 113 and controls the respective parts of the printer controller 10 to execute the printing process of the printing job. Further, the job control part 110 interrupts the printing process when the job control part 110 receives the jam detecting signal from the jam detecting part 105.

Figure 3:
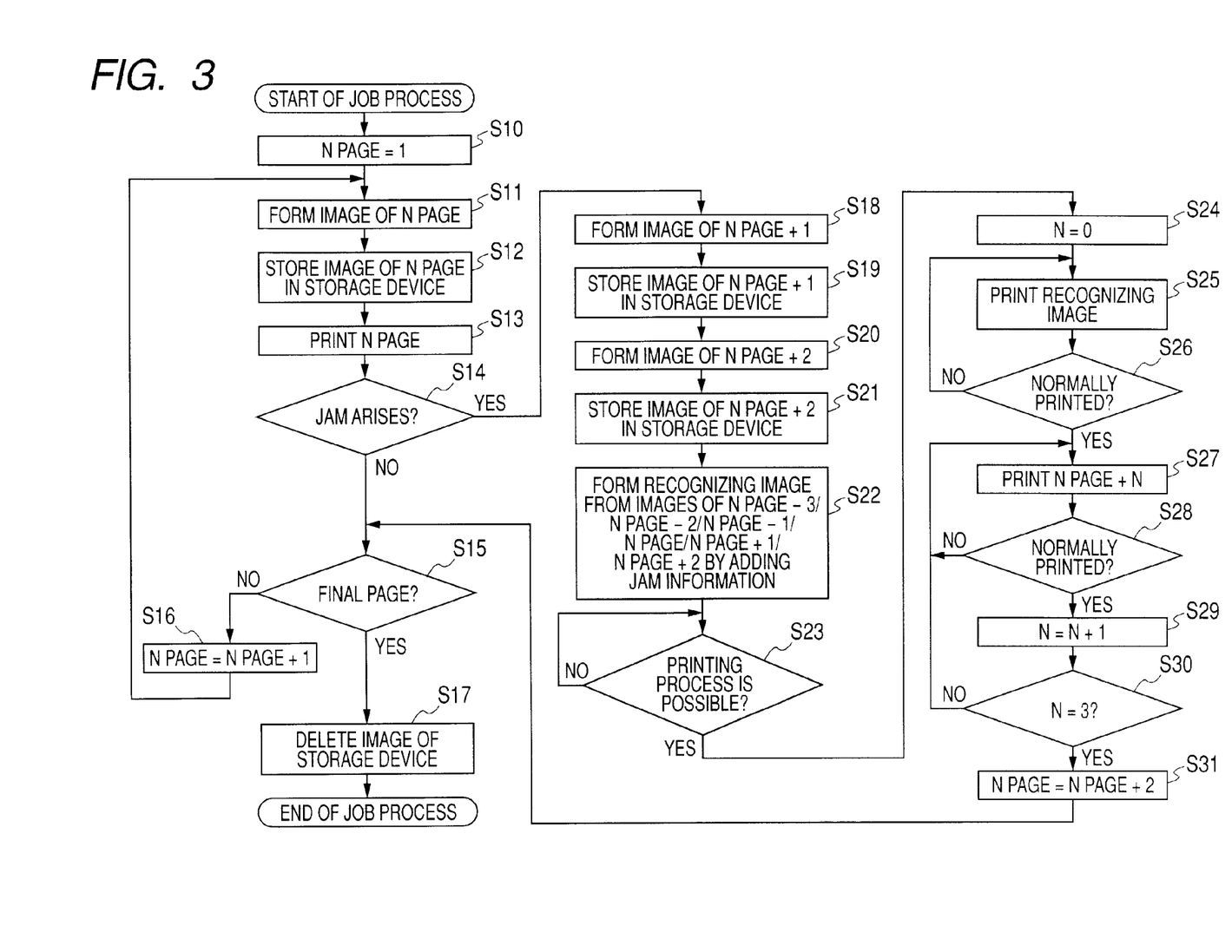
FIG. 3 is a flowchart showing an operation of the printer system.

The jam recovery control part 111 carries out a control to resume the printing process interrupted due to the occurrence of the jam. The job control part 110 and the jam recovery control part 111 are composed of a CPU, a ROM, a RAM or the like. The CPU operates in accordance with an image processing program as shown in FIG. 3 that is stored in the ROM to function as a resuming unit, an output processing unit and an output control unit.

The recognizing image forming part 112 forms a recognizing image that N pages before and after a page in which the printing process is resumed are laid out on one page in accordance with resuming information from the jam recovery control part 111. This recognizing image includes information such as a jam generating time, the page in which the printing process is resumed, the contents of the printing job (the name of the jam) or the like. The information included in the recognizing image is not limited thereto.

As the size of a recognizing sheet on which the recognizing image is printed, a sheet size larger both in length and breadth than the sheet size designated by the printing job may be preferably used. Further, the size of the recognizing sheet larger either the length or the breadth than the sheet size designated by the printing job may be used.

The storage device 113 is formed with, for instance, a ROM, a RAM, an HDD, or the like.

(Control Panel)

The control panel 11 includes a liquid crystal touch panel for carrying out an input or a display and hard keys such as a start key for instructing to resume the printing process interrupted by the jam, a stop key for forcedly interrupting the printing process or the like.

(Image Output Part)

The image output part 12 serves to print and output print data to a sheet and an electro-photographic system, an ink jet system or the like can be used. The image output part 12 includes a plurality of sheet trays for accommodating the sheets of different sheet sizes (including the recognizing sheet), a conveying part for conveying the sheet from the sheet tray to a printing position and conveying the sheet on which an image is printed to a discharge tray and the plurality of sheet detecting sensors 14 arranged on the parts of a conveying path. The sheet detecting sensor 14 outputs the sheet detecting signal to the jam detecting part 105 when the sheet detecting sensor detects the sheet. For instance, a photosensor can be used.

(Post-Process Part)

When in print instruction information included in the printing job, it is described that a post-process is to be carried out to the sheet printed by the image output part 12, the post-process part 13 carries out a designated post-process such as stapling, punching, sorting or the like.

(Operation of Printer System)

FIG. 3 is a flowchart showing the operation of the printer system.

(1) Execution of Printing Job

When the print instruction is transmitted from the print driver by the user, the client terminal 2 converts the document data and the print instruction information of the user into the printing job of the PDL form and transmits the printing job to the printer 1.

When the job control part 110 of the printer 1 receives the printing job from the client terminal 2 through the client communication part 101, the job control part 110 stores the printing job in the storage device 113. The job control part 110 sequentially carries out the printing process to the printing job stored in the storage device 113.

The job control part 110 sets 1 to N page (S10). The PDL processing part 102 interprets the PDL data of the N page under the control of the job control part 110, expands the PDL data to the raster image data (S11) and stores the raster image data in the storage device 113 (S12). The print image generating part 103 converts the raster image data to the CMYK form so as to be adapted to the image output part 12. The output control part 104 outputs the print image generated by the print image forming part 103 to the image output part 12. The image output part 12 prints and outputs the print image outputted from the output control part 104 on the sheet designated by the printing job (S13).

The job control part 110 decides whether or not the jam arises (S14). When the jam does not arise (S14: No), the job control part 110 decides whether or not the page is a final page, that is, N page=N (S15). When the page is not the final page (S15: No), the job control part 110 sets N page+1 to the N page (S16) to carry out the steps S11 to S15. When the printing process to the final page from a first page is completed (S15:Yes), the job control part 110 deletes the printing job stored in the storage device 113 (S17).

(2) Operation after Jam Arises

In the above-described step S14, when the jam detecting part 105 detects the jam of the sheets (s14:Yes), the jam detecting part 105 outputs the jam detecting signal showing the position where the jam arises to the job control part 110. When the job control part 110 receives the jam detecting signal, the job control part 110 interrupts the printing process to the printing job until a resuming command signal is inputted. Further, when the jam arises, the job control part 110 displays a message on the liquid crystal touch panel of the control panel 11. The message includes the position where the jam arises or a method for meeting the jam or the like.

The user takes out the sheet existing in the conveying path due to the occurrence of the jam in accordance with the method for meeting the jam displayed on the liquid crystal touch panel of the control panel 11 and presses down the start button of the control panel 11. The control panel 11 transmits the resuming command signal to the job control part 110 by pressing down the start button.

The PDL processing part 102 interprets the PDL data of the N page+1 under the control of the job control part 110, expands the PDL data to the raster image data (S18) and stores the raster image data in the storage device 113 (S19). The PDL processing part 102 interprets the PDL data of N page+2 under the control of the job control part 110, expands the PDL data to the raster image data (S20) and stores the raster image data in the storage device 113 (S21).

The job control part 110 supplies jam information related to the jam such as a time and a position where the jam arises to the jam recovery control part 111 in accordance with the resuming command signal to allow the jam recovery control part 111 to carry out a jam recovery process.

The jam recovery control part 111 determines a page in which the printing process is resumed on the basis of the jam information. Further, the jam recovery control part 111 outputs the resuming information including the information of the determined page in which the printing process is resumed to the recognizing image forming part 112 to allow the recognizing image forming part 112 to form the recognizing image.

The recognizing image forming part 112 forms the recognizing image on the basis of the resuming information (S22).

Whether or not the recognizing image can be printed is decided (S23). When the recognizing image can be printed, that is, when the resuming command signal from the control panel 1 is received (S23: Yes), 0 is set to N (S24) and the recognizing image is printed (S25).

(Specific Example of Recognizing Image)

Figure 2A:
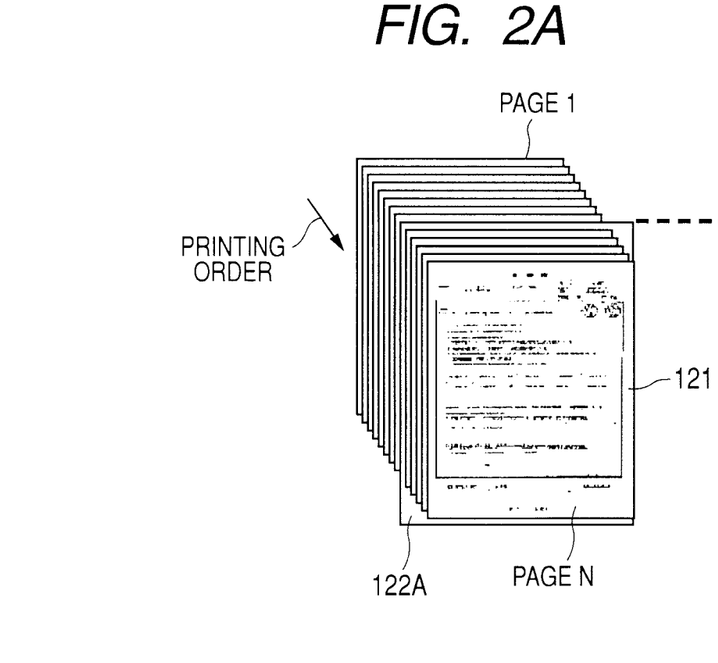
FIG. 2A is a perspective view of a printed matter and FIG. 2B is a front view showing the recognizing image printed on a recognizing sheet.
Figure 2B:
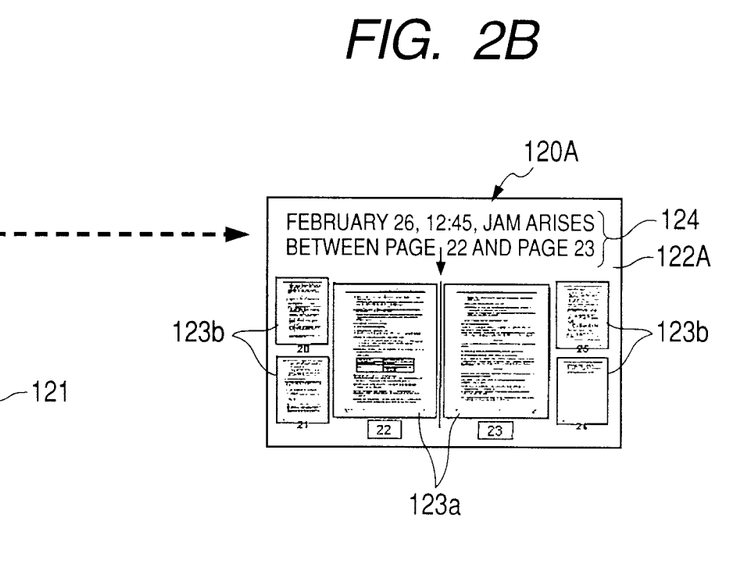

FIG. 2 shows one example of the recognizing image. FIG. 2(a) is a perspective view showing a printed matter and FIG. 2(b) is a front view showing the recognizing images printed on the recognizing sheet.

In the recognizing sheet 122A, both the length and the breadth may preferably have sizes larger than the sizes of the sheet designated by the printing job (a sheet designated by a job) 121. For instance, when the sheet size designated by the printing job is A4 (210×297 mm), the sheet size of the recognizing sheet is set to 220×307 mm.

The recognizing image 120A includes page images 123a and 123b of three pages before and after the page in which the printing process is resumed, herein, pages 20 to 22 before a position where the printing process is resumed and pages 23 to 25 after the position where the printing process is resumed. The page images 123a one page (the page 22 and the page 23) before and after the position where the printing process is resumed are displayed to be larger than the page images 123b of other pages (pages 20, 21, 24 and 25). Further, the recognizing image 120A includes the jam information 124 composed of the time when the jam arises (February 26, 12:45) and the position where the printing process is resumed (a position between the page 22 and the page 23). Here, as a range of the pages allowed to be included in the recognizing image 120A, pages located within a prescribed range meeting the characteristics of the printer 1 that include the page in which the printing process is resumed, for instance, pages of a range corresponding to the sheets staying in the printer 1 when the printing process is interrupted, in place of the three pages before and after the page in which the printing process is resumed.

After the recognizing image 120A is printed (S25), it is decided whether or not the recognizing image is normally printed (S26). When the recognizing image is normally printed (S26: Yes), N page+N is printed (S27). It is decided whether or not the N page+N is normally printed (S28). When the N page+N is normally printed (S28: Yes), N+1 is set to N (S29). It is decided whether or not N reaches 3 (S30). When N reaches 3 (S30: Yes). N page+2 is set to N page (S31) to advance to the above-described step S15.

Second Embodiment

In the first embodiment, an example is described that one kind of recognizing sheet is used. In a second embodiment, an example is described that a plurality of kinds of recognizing sheets are employed. Further, in the first embodiment, the recognizing image is printed and outputted before the interrupted printing process is resumed. However, in the second embodiment, after a printing process is completed, an outputting mode is provided.

Figure 6:
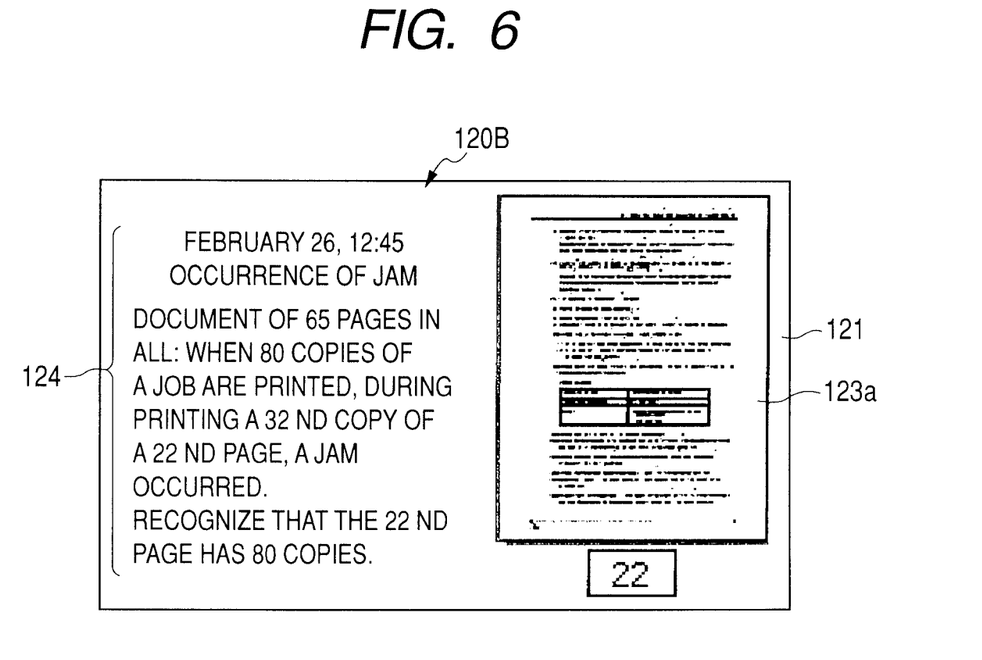
FIG. 6 is a diagram showing one example of the recognizing image according to the second embodiment of the present invention.
Figure 7:
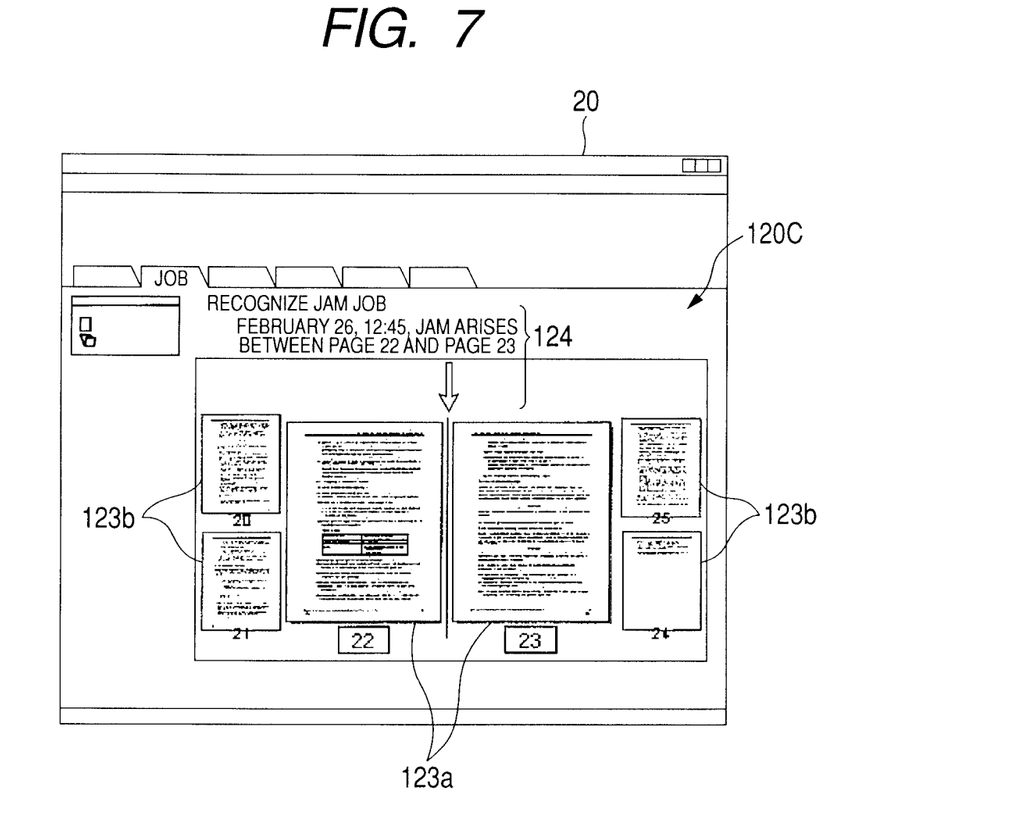
FIG. 7 is a diagram showing one example of the recognizing image according to the second embodiment of the present invention.
Figure 8:
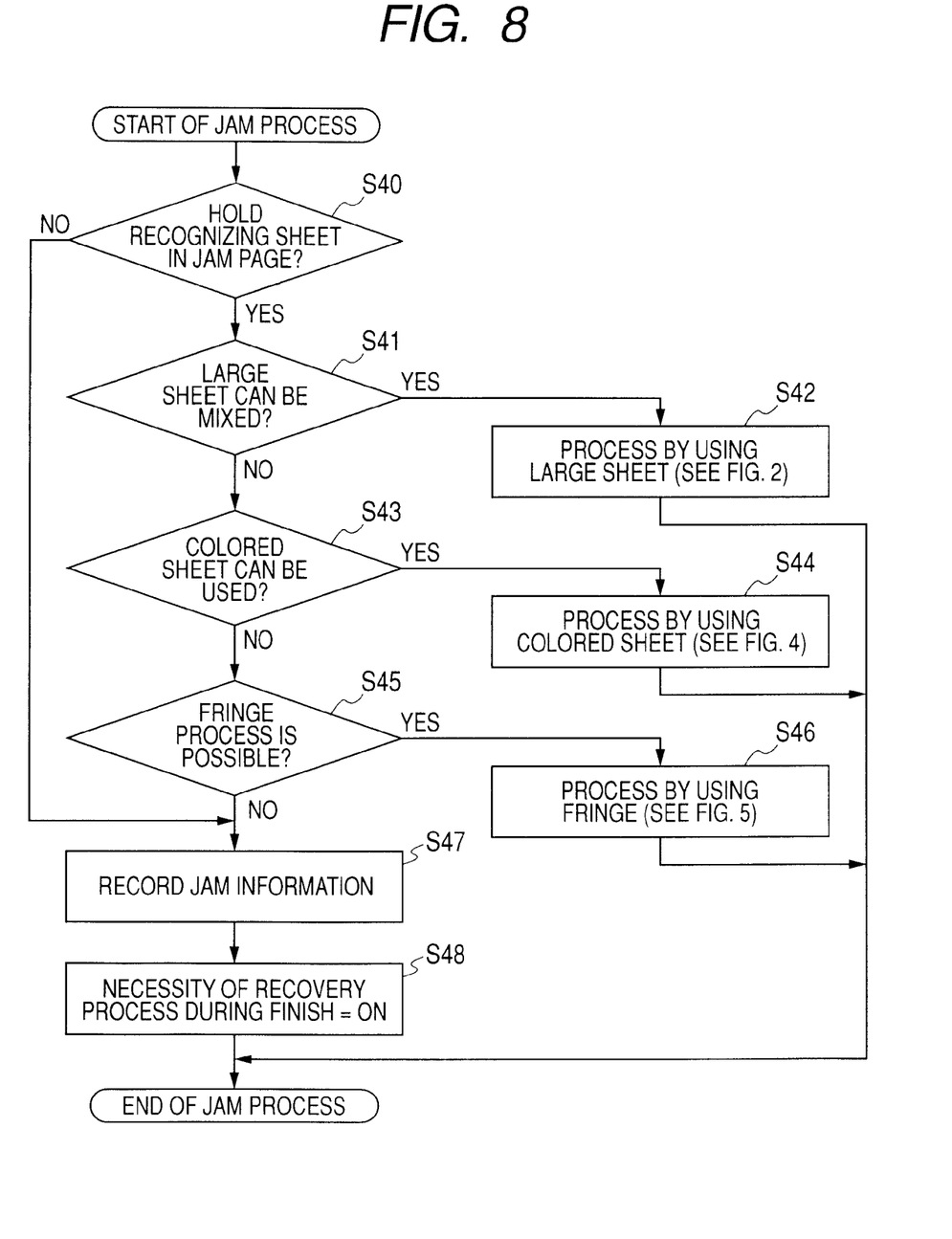
FIG. 8 is a flowchart showing a jam process according to the second embodiment of the present invention.
Figure 9:
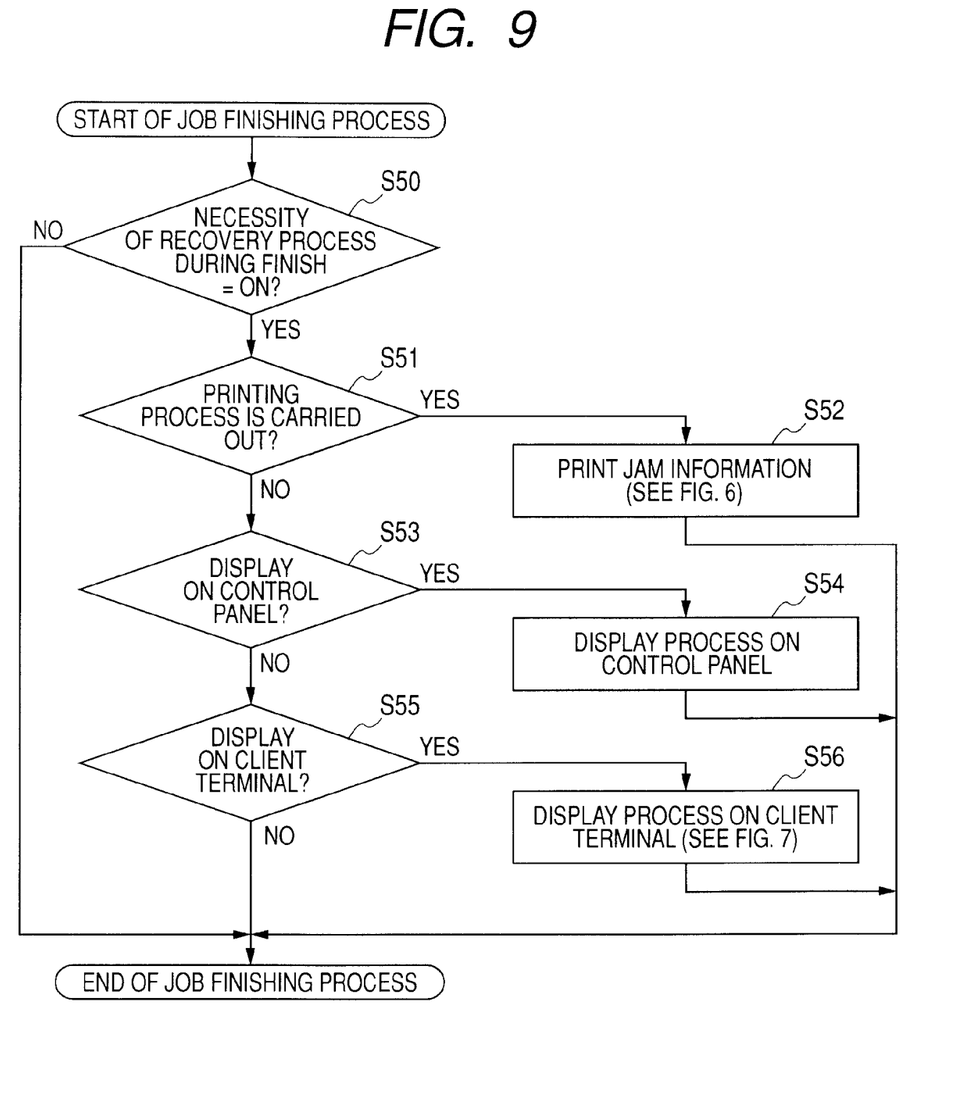
FIG. 9 is a flowchart showing a job finishing process according to the second embodiment of the present invention.

FIGS. 4 to 7 show diagrams showing one example of a recognizing image according to the second embodiment. FIG. 8 is a flowchart showing a jam process according to the second embodiment. FIG. 9 is a flowchart showing a job finishing process according to the second embodiment.

Whether or not the recognizing sheet is held at a position where the printing process is resumed (S40). When the recognizing sheet is held at the position where the printing process is resumed (S40: Yes), it is decided whether or not a large sheet can be mixed (S41). When the large sheet can be mixed (S41: Yes), a process by using the large sheet 122A is carried out as shown in FIG. 2 (S42).

Figure 4A:
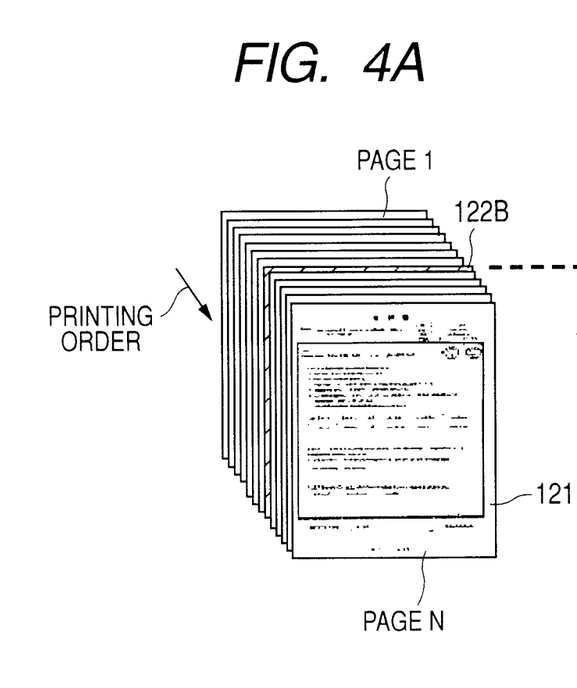
FIG. 4 is a diagram showing one example of a recognizing image according to a second embodiment of the present invention.
Figure 4B:
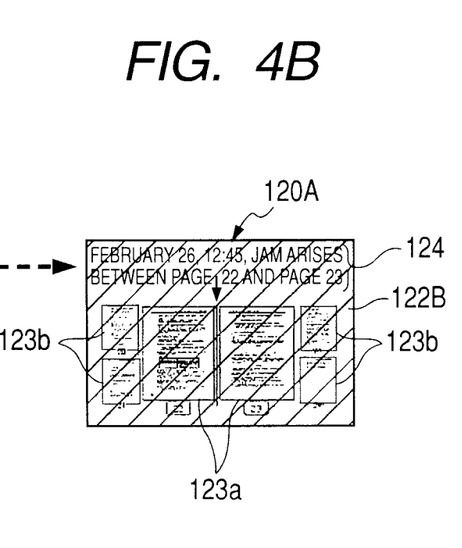

When the large sheet cannot be mixed (S41:No), it is decided whether or not a colored sheet can be used (S43). When the colored sheet can be used (S43: Yes), a process by using a colored sheet 122B is carried out that the recognizing image 120A is printed on the recognizing sheet 122B of the colored sheet as shown in FIG. 4. The contents of the recognizing image 120A is the same as those described by referring to FIG. 2(b).

Figure 5A:
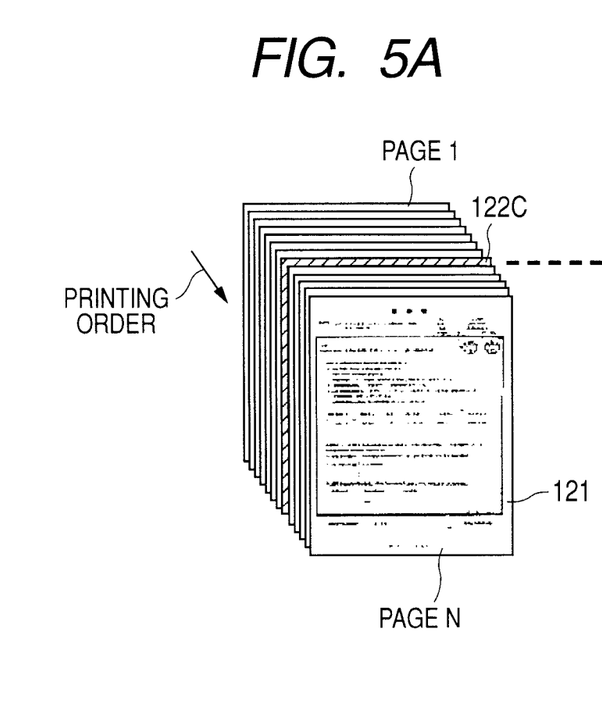
FIG. 5 is a diagram showing one example of the recognizing image according to the second embodiment of the present invention.
Figure 5B:
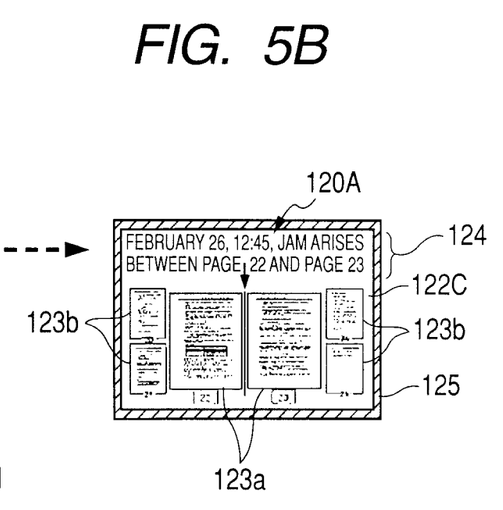

When the colored sheet 122B cannot be used (S43: No), it is decided whether or not a fringe process can be carried out (S45). When the fringe process can be carried out (S45: Yes), the fringe process is carried out that a recognizing image 120A is printed on a recognizing sheet 122C having a fringe 125 such as a black frame as shown in FIG. 5 (S46). The contents of the recognizing image 120A are the same as those described by referring to FIG. 2(b). The color of the fringe 125 may be other color than black. The recognizing sheet 122B shown in FIG. 4 or the recognizing sheet 122C shown in FIG. 5 may be previously set in an exclusive sheet tray and may be used as a recognizing sheet by coloring a job designating sheet 121 during the printing process.

When the recognizing sheet is not held at the position where the printing process is resumed in the above-described step 40 (S40:No), jam information is stored in a storage device 113 (S47) and sets a necessity of a recovery process during a finish to ON (S48).

After the printing process is carried out after a jam arises, it is decided whether or not the necessity of the recovery process during the finish is set to ON (S50). When the necessity of the recovery process during the finish is set to ON (S50: Yes), it is decided whether or not the printing process can be carried out (S51). When the printing process can be carried out (S51: Yes), resuming information is printed as shown in FIG. 6 (S52). When N copies are printed, in the case of a stack printing that the same pages are continuously printed, it is meaningless to print pages before and after a page in which the printing process is resumed. Thus, a remaining image interrupted by the jam is printed, and then, the recognizing image is printed. In a recognizing image 120B shown in FIG. 6, for instance, the recognizing image 120B includes the page image 123a of the page in which the printing process is resumed and the resuming information 124 in the job designating sheet 121.

When the printing process cannot be carried out (S51: No), it is decided whether or not the recognizing image can be displayed on a control panel 11 (S53). When the recognizing image can be displayed on the control panel 11 (S53: Yes), a display process of, for instance, the recognizing image 120B shown in FIG. 6 on the control panel 11 is carried out (S54). To eliminate the rejected printed matter of the recognizing image, the recognizing image may be preferably displayed on the control panel 11.

When the recognizing image cannot be displayed on the control panel 11 (S53: No), it is decided whether or not the recognizing image can be displayed on a client terminal 2 (S55). When the resolution of a liquid crystal touch panel of the control panel 11 is not adequate and the recognizing image can be displayed on the client terminal 2 (S55: Yes), a recognizing image 120C is displayed on a display 20 of the client terminal 2 by using a Web browser (S56) as shown in FIG. 7.

In the above-described step S50, when the necessity of the recovery process during the finish is not set to ON (S50: No), and when the recognizing image cannot be displayed on the client terminal 2 (S55: No), the job finishing process is finished.

First Modified Example

Figure 10:
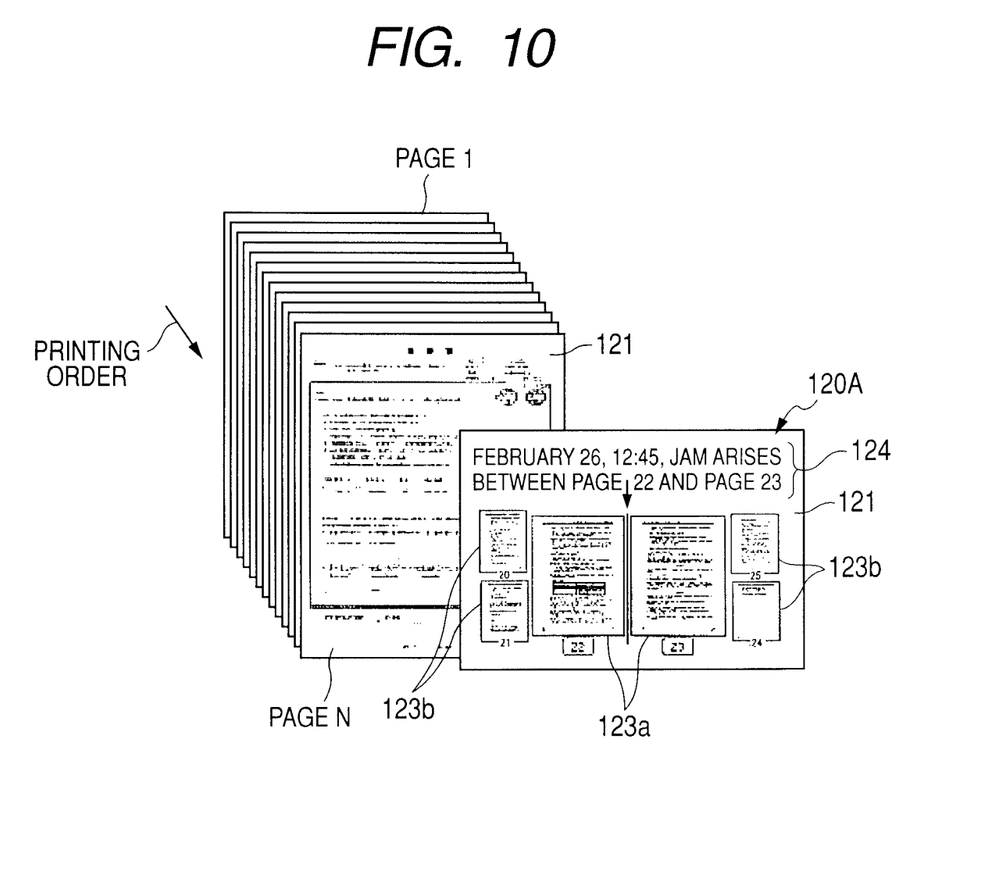
FIG. 10 is a diagram showing a first modified example of a recognizing image.

FIG. 10 is a diagram showing a first modified example of a recognizing image. When it is difficult to print and output the recognizing image between printed matters, for instance, when a post-process such as stapling is carried out, sheets designated by a printing job have colored sheets or sheet sizes mixed. In this case, when a printer cannot print on an end of the sheet, the printing job interrupted by a jam is carried out, and then, the recognizing image 120A is printed as shown in FIG. 10.

Second Modified Example

Figure 11:
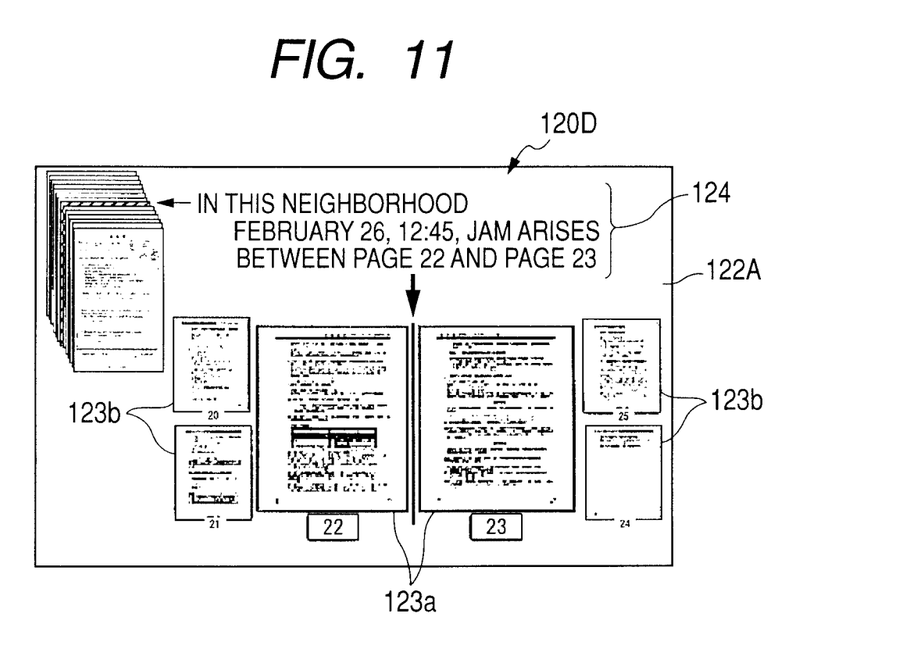
FIG. 11 is a diagram showing a second modified example of a recognizing image.

FIG. 11 is a diagram showing a second modified example of a recognizing image. In the recognizing image 120D shown in FIG. 11, as can be visually understood about a position where a jam arises, printed matters and an arrow mark and words (in this neighborhood) showing a jam arising position are added to the recognizing image 120A shown in FIG. 2.

Third Modified Example

Figure 12A:
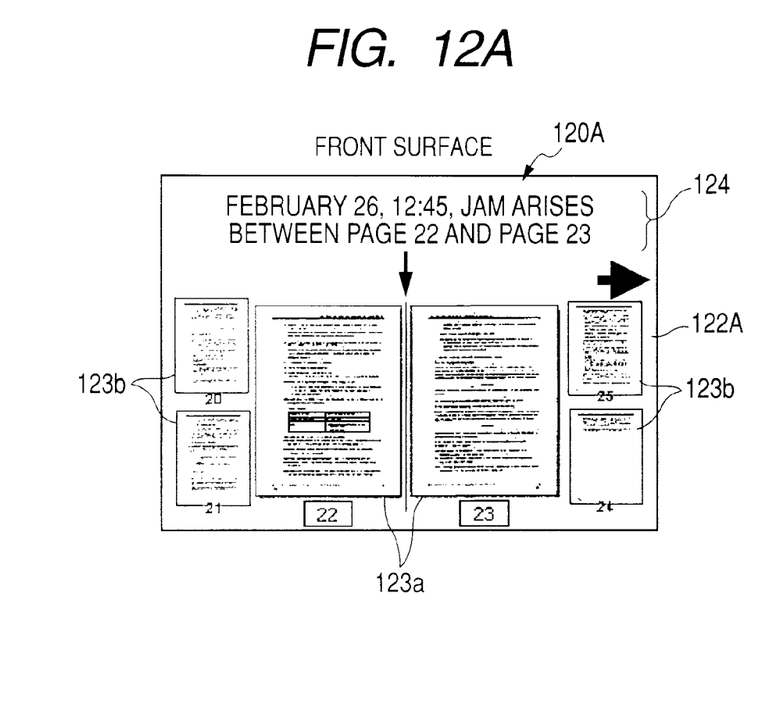
FIG. 12 is a diagram showing a third modified example of a recognizing image.
Figure 12B:
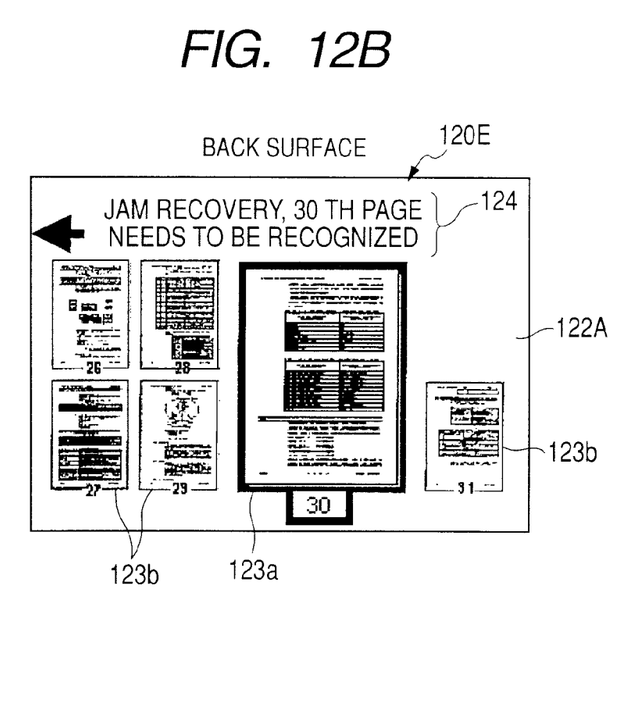

FIG. 12 is a diagram showing a third modified example of a recognizing image. Depending on the kinds of printers, some of them may have characteristics peculiar to the printer that when a jam arises, an imperfect printing is generated at positions the prescribed number of pages before or after a page in which a printing process is resumed. In such a case, as shown in FIG. 12, the recognizing image 120A is printed on a front surface of a recognizing sheet 122A and an additional recognizing image 120E is printed on a back surface of the recognizing sheet 122A. On the recognizing image 120E, a page image 123a the prescribed number of pages (in FIG. 12, 7 pages after) before or after a position where the printing process is resumed that is most desired to be recognized is displayed to be large and other page images 123b are displayed to be small.

Figure 13:
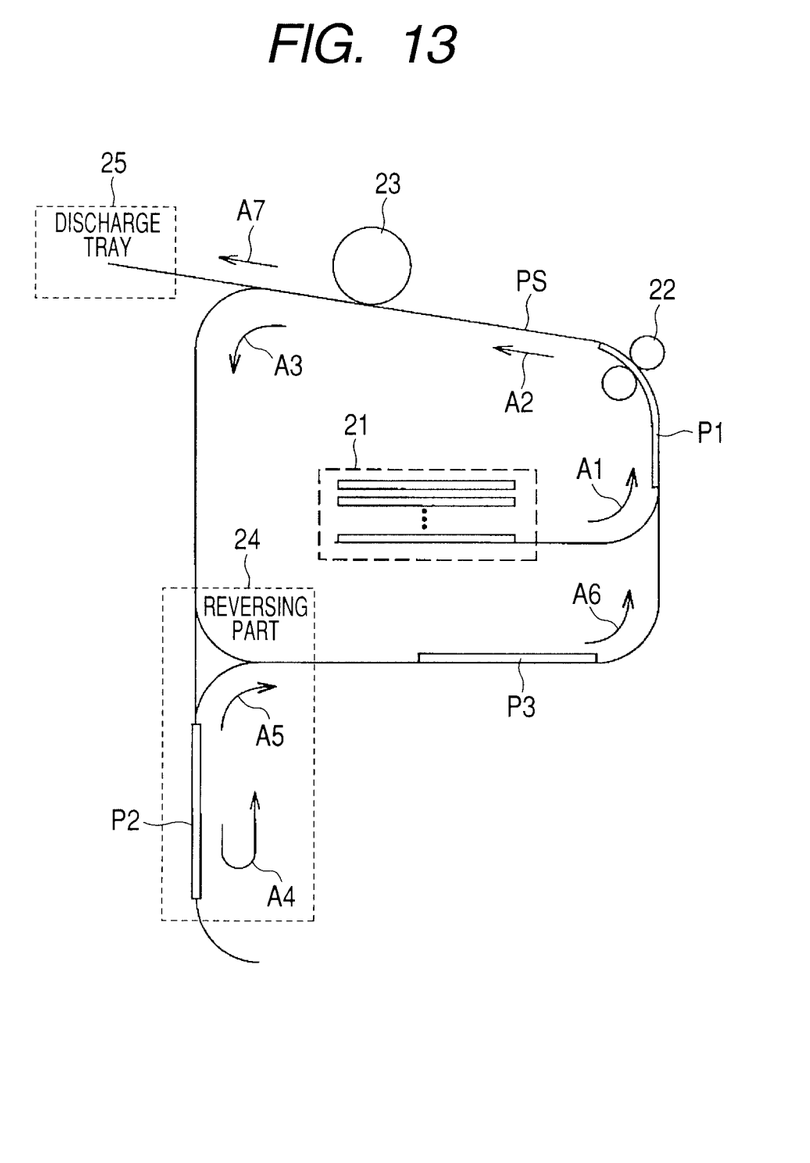
FIG. 13 is a diagram showing a paper path of a printer according to the third modified example.

FIG. 13 shows a paper path of the printer according to the third modified example. In FIG. 13, P1 to P3 designate standby positions of the sheet, and A1 to A7 designate conveying directions of the sheet. The sheet fed from a sheet tray 21 is conveyed to the directions A1 and A2 along the paper path PS. After a toner image is transferred to the front surface of the sheet by a transfer drum 23, the sheet is conveyed to the direction A3, reversed in a reversing part 24 and conveyed to the directions A4, A5, A6 and A2. After a toner image is transferred to the back surface of the sheet by the transfer drum 23, the sheet is conveyed to the direction A7 and discharged to a discharge tray 25. In the case of the printer having the paper path PS, three sheets are allowed to flow on the paper path PS at the same time. The printer of such a structure has characteristics that when the jam arises in the printer, pages the prescribed number of pages before or after the page in which the printing process is resumed also have images insufficiently transferred.

Other Embodiments

The present invention is not limited to the above-described embodiments respectively, and various modifications may be made within a scope without departing the gist of the present invention and the components of the embodiments may be arbitrarily combined together within a scope without departing the gist of the present.

In the above-described embodiments, as an example that an image forming operation is interrupted, the jam is explained, however, for instance, the image forming operation may be interrupted by a power stoppage or the like.

In FIGS. 2, 4 and 5, a printing order starts from the page 1, however, the printing order may start from the page N.

Further, in the above-described embodiments, as the sheet for printing the recognizing image, the sheet (the recognizing sheet or the job designating sheet) used in other embodiments may be used.

In the above-described embodiments, the resuming unit and the forming unit are realized by the CPU and an image processing program, however, a part or all of them may be realized by a hardware such as an integrated circuit (ASIC: Application Specific IC) for a specific use.

A program used in the above-described embodiments may be read to a storing part of the device from a storing medium such as a CD-ROM or may be downloaded to the storing part of the device from a server connected to a network such as the internet.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A printing system comprising:
   a printing unit that carries out a printing process that prints plural copies of document data having plural pages over a plurality of print papers;
   a resuming unit that allows the printing unit to resume an interrupted printing process; and
   an output control unit that carries out an output control of outputting resuming information,
   wherein the resuming information includes:
   a reduced image of a page from which the printing process is resumed; and
   information of a position where the printing process is resumed wherein the resuming information includes reduced images of pages located in a prescribed range having the page from which the printing process is resumed,
   wherein the resuming information is printed out on a recognizing sheet, which is different from the print papers,
   wherein the interrupted printing process is a stack printing process in which copies of a same page of the document data are repeatedly printed, and
   wherein the recognizing sheet is placed at an end of the printed copies of the same page in which an interrupt occurred.

2. The printing system as claimed in claim 1, wherein the pages located in the prescribed range that are included in the resuming information are pages of a range meeting characteristics of the printing device.

3. The printing system as claimed in claim 1, wherein the recognizing sheet is a different color than the print papers.

4. A non-transitory computer readable medium storing a program causing a computer to execute a process for performing an image processing, the process comprising:

resuming an interrupted printing process that prints plural copies of document data having plural pages over a plurality of print papers; and carrying out an output control of outputting resuming information, wherein the resuming information includes:

a reduced image of a page from which the printing process is resumed; and information of the page from which the printing process is resumed, wherein the resuming information includes reduced images of pages located in a prescribed range having the page from which the printing process is resumed, wherein the resuming information is printed out on a recognizing sheet, which is different from the print papers, wherein the interrupted printing process is a stack printing process in which copies of a same page of the document data are repeatedly printed, and wherein the recognizing sheet is placed at an end of the printed copies of the same page in which an interrupt occurred.

5. An image processing method comprising;

resuming, by a resuming unit, an interrupted printing process that prints plural copies of document data having plural pages over a plurality of print papers; and carrying out, by an output control unit, output control of outputting resuming information, wherein the resuming information includes:

a reduced image of a page from which the printing process is resumed; and information of the page from which the printing process is resumed, wherein the resuming information includes reduced images of pages located in a prescribed range having the page from which the printing process is resumed, wherein the resuming information is printed out on a recognizing sheet, which is different from the print papers, interrupted printing process is a stack printing process in which copies of a same page of the document data are repeatedly printed, and wherein the recognizing sheet is placed at an end of the printed copies of the same page in which an interrupt occurred.

\* \* \* \* \*